(12) United States Patent
Mo et al.

(10) Patent No.: US 11,766,004 B2
(45) Date of Patent: Sep. 26, 2023

(54) DRIP IRRIGATION APPARATUS AND SYSTEM

(71) Applicants: CHINA INSTITUTE OF WATER RESOURCES AND HYDROPOWER RESEARCH, Beijing (CN); BEIJING AITEFU WATER SAVING TECHNOLOGY CO., LTD., Beijing (CN)

(72) Inventors: Yan Mo, Beijing (CN); Jiandong Wang, Beijing (CN); Yanqun Zhang, Beijing (CN); Qiaoling Li, Beijing (CN); Shihong Gong, Beijing (CN); Di Xu, Beijing (CN); Xiaoyan Gao, Beijing (CN)

(73) Assignees: CHINA INSTITUTE OF WATER RESOURCES AND HYDROPOWER RESEARCH, Beijing (CN); BEIJING AITEFU WATER SAVING TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 17/525,055

(22) Filed: Nov. 12, 2021

(65) Prior Publication Data
US 2022/0142064 A1    May 12, 2022

(30) Foreign Application Priority Data

Nov. 12, 2020 (CN) .......................... 202011259298.X

(51) Int. Cl.
*A01G 25/02* (2006.01)

(52) U.S. Cl.
CPC ................................ *A01G 25/023* (2013.01)

(58) Field of Classification Search
CPC ............................. A01G 25/02; A01G 25/023
See application file for complete search history.

(56) References Cited

U.S. PATENT DOCUMENTS

| 10,285,342 | B2* | 5/2019 | Ensworth ............. A01G 25/023 |
| 10,440,903 | B2* | 10/2019 | Kim ..................... A01G 25/026 |
| 2010/0096478 | A1* | 4/2010 | Mamo ............... B29C 45/14598 |
| | | | 239/542 |
| 2014/0027539 | A1* | 1/2014 | Kim ....................... B29D 23/00 |
| | | | 264/154 |
| 2015/0041563 | A1* | 2/2015 | Ensworth ............. A01G 25/023 |
| | | | 29/890.141 |
| 2015/0041564 | A1* | 2/2015 | Ensworth ............... A01G 25/02 |
| | | | 239/542 |

(Continued)

*Primary Examiner* — Monica L Perry
*Assistant Examiner* — Aaron M Rodziwicz
(74) *Attorney, Agent, or Firm* — Emerson, Thomson & Bennett, LLC; Roger D. Emerson; Matt J. Wilson

(57) ABSTRACT

A drip irrigation apparatus and system. The drip irrigation apparatus includes a flow channel body and an elastic body. The elastic body is mounted on the outer circumference of the flow channel body and fitted in a spontaneous state to the outer circumference of the flow channel body. The flow channel body includes an energy dissipation body. The first drainage channel is formed in the energy dissipation body, the first drainage channel is connected to both ends of the energy dissipation body. The first drainage channel is connected at both ends of the first drainage channel to the inner wall of the elastic body forming a radial drainage channel.

2 Claims, 3 Drawing Sheets

(56) References Cited

U.S. PATENT DOCUMENTS

| | | | |
|---|---|---|---|
| 2015/0090816 A1* | 4/2015 | Akritanakis | A01G 25/023 239/542 |
| 2019/0281774 A1* | 9/2019 | Noguchi | A01G 25/16 |
| 2019/0313590 A1* | 10/2019 | Wlassich | A01G 25/023 |
| 2019/0373827 A1* | 12/2019 | Ensworth | A01G 25/023 |
| 2019/0388924 A1* | 12/2019 | Yanagisawa | B05B 12/088 |

* cited by examiner

DRIP IRRIGATION APPARATUS AND SYSTEM

TECHNICAL FIELD

The present invention belongs to the technical field of drip irrigation, in particular, relates to a drip irrigation irrigator and a drip irrigation system.

BACKGROUND

Underground drip irrigation is a method of irrigation in which the irrigation capillary tube and its irrigator are buried in the soil, and water or a mixture of water and fertilizer is slowly infiltrated into the soil in the root zone of the crop, and then the water is diffused to the root layer for crop absorption and utilization by capillary action or gravity. It has many advantages such as significant water savings, yield increase, pest reduction and being used for many years (usually up to 15 to 20 years). In order not to affect soil tillage, the capillary tube needs to be buried below the tillage layer (≥30 cm). Because the capacity of surface soil is too small and the capillary action is too weak, it is difficult for the water supply from the low-flow irrigator to rise to the surface where the seeds are buried, resulting in lower seedling emergence and yield reduction. In the seed germination stage, a higher flow rate irrigation method such as sprinkler or surface irrigation is generally used, which requires 2 sets of irrigation systems, increasing investment costs.

In areas with severe soil salinization, such as Xinjiang and Inner Mongolia, it is essential to use large watering for autumn or winter irrigation for desalination, while the commonly used underground drip irrigation irrigator has a small water flow, which is suitable for the crop growth required in the growth period and has poor effect of restraining slat content. At present, the commonly used technical measures are, crop fertility with drip irrigation, autumn watering or winter irrigation with ground irrigation or sprinkler irrigation, but they will increase the engineering investment.

The ecological protection and high quality development of the Yellow River basin has put forward new requirements for the diversion irrigation. The diversion drip irrigation can alleviate the problem of water scarcity along the Yellow River, but the problem of sediment blockage brought by the diversion drip irrigation has never been effectively solved, which seriously restricts the development of drip irrigation technology in the diversion irrigation area, especially for the underground drip irrigation system, the blockage of irrigator means that the irrigation system needs to be dismantled and rebuilt.

SUMMARY

The purpose of the present invention is to provide a drip irrigation irrigator which can solve the technical problem that the drip irrigator cannot adapt to different flow requirements mentioned in the background technology.

This aspect of the invention provides a drip irrigation irrigator comprising a flow channel body and an elastic body. The elastic body being mounted on an outer periphery of the flow channel body and fitting to the outer periphery of the flow channel body in a spontaneous state, the flow channel body comprising an energy dissipation body, the energy dissipation body having a first drainage channel, the first drainage channel being connected to two ends of the energy dissipation body, the energy dissipation body being connected at two ends of the first drainage channel to the inner wall of the elastic body to form a radial drainage channel.

The beneficial effect of this aspect of the invention is that:

The energy dissipation body forms a radial drainage channel with the inner wall of the elastic body at two ends of the first drainage channel, and can use the water in the radial drainage channel to apply pressure to the inner wall of the elastic body when the water pressure in the first drainage channel increases, so that the elastic body can expand outward in the radial direction, and thus the second drainage channel can be formed between the inner wall of the elastic body and the outer wall of the energy dissipation body. When the water pressure is too low to expand the elastic body, the elastic body closes the periphery of the energy dissipation body, allowing water to flow only through the first drainage channel of the energy dissipation body to meet the need of normal low flow drip irrigation.

The formation of the second drainage channel, not only directly increases the total cross-sectional area of the drainage channel, but also the water flowing along the second drainage channel will not be impeded by the effect of the energy dissipation body, the discharge of water from the irrigator can be significantly increased. When the large sediment content in the water causes blockage to the first drainage channel, the automatic opening of the second drainage channel can carry the sediment in the first drainage channel out of the irrigator to solve the problem of blockage of the irrigator.

The drip irrigation irrigator can be used in situations where the underground drip irrigation system requires a large water discharge, such as where the capillary action of the top soil is weak and crop emergence needs to be ensured, or where the soil salinity is drenched, or where the water source has a high sediment content and the irrigator is prone to clogging. The drip irrigation irrigator can meet the needs of common small flow drip irrigation water supply scenarios, as well as the occasions requiring larger water discharge, without the need to build a separate irrigation system, saving engineering investment.

In an optional embodiment, the energy dissipation body has annular projections at the two end, the annular projections extending along a circumference of the energy dissipation body, the elastic body having two ends set on the annular projections.

In an optional embodiment, it further comprises an outer sleeve, the outer sleeve being set outside the elastic body.

In an optional embodiment, the energy dissipation body comprises a first flow channel tooth set, a second flow channel tooth set and support ribs, the first flow channel tooth set comprising a plurality of flow channel teeth, the second flow channel tooth set comprising a plurality of flow channel teeth, respective flow channel teeth of the first flow channel tooth set and the second flow channel tooth set being staggered and spaced apart; the first flow channel tooth set and the second flow channel tooth set forming a first drainage channel between the first flow channel tooth set and the second flow channel tooth set, respective flow channel teeth of the first flow channel tooth set being connected by the support ribs, respective flow channel of the second flow channel tooth set being connected by the support ribs.

In an optional embodiment, the first drainage channel extends from the circumference of the energy dissipation body on one side of the two support ribs to the circumference of the energy dissipation body on the other side of the two support ribs.

In an optional embodiment, the energy dissipation body comprises a tube section, the tube section being located at the two ends of the first drainage channel and having a radial opening, the radial opening being located between the annular projections at one end of the energy dissipation body and the annular projections at the other end of the energy dissipation body, forming a radial drainage channel.

In an optional embodiment, the energy dissipation body comprises a first insertion section at one end in a water discharge direction, and the flow channel body further comprising an outlet component, an end of the outlet component facing the energy dissipation body having a second insertion section, the first insertion section being inserted into the second insertion section, and an end face of the second insertion section resting against the elastic body.

In an optional embodiment, the flow channel body further comprises an inlet component, the inlet component comprising an inlet grille and a first drip irrigation adhesive surface, the inlet grille facing radially towards the flow channel body, and the first drip irrigation adhesive surface and the inlet grille being located on the opposite sides of the inlet component.

In an optional embodiment, the flow channel body further comprises an outlet component, the outlet component having a second drip irrigation adhesive surface, the second drip irrigation adhesive surface being oriented in opposite direction to the first drip irrigation adhesive surface.

A second aspect of the present invention is to provide a drip irrigation system that solves the technical problem provided by the background technology that the drip irrigation irrigators currently on the market cannot adapt to different flow requirements.

The invention of this aspect provides a drip irrigation system comprising a drip irrigation irrigator according to any of the embodiments.

The beneficial effect of this aspect of the invention is that:

Since the drip irrigation system provided in this aspect includes the irrigation irrigator of any of the above, it has the technical effect of the irrigation irrigator of any of the above, which will not be repeated here.

BRIEF DESCRIPTION OF THE DRAWINGS

In order to illustrate the technical solutions in the specific embodiments or prior art of the present invention more clearly, the following is a brief description of the accompanying drawings that need to be used in the description of the specific embodiments or prior art, it will be obvious that the accompanying drawings in the following description are some embodiments of the present invention, and that other accompanying drawings may be obtained from these drawings without creative effort for a person of ordinary skill in the art.

Figure 1:
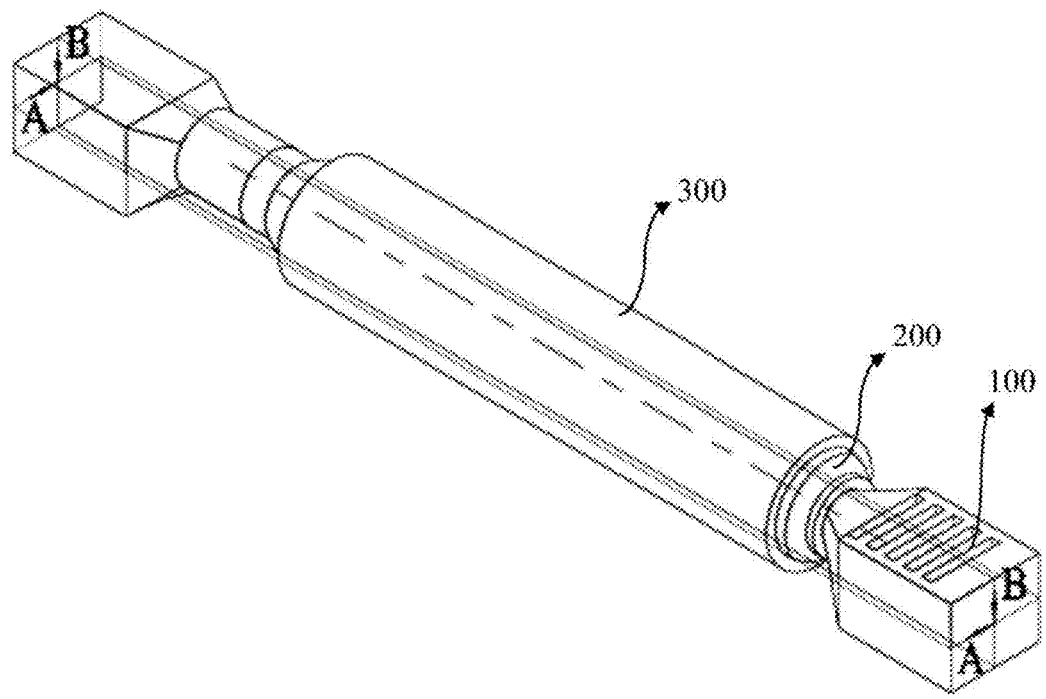
FIG. 1 shows an axonometric drawing of the drip irrigation irrigator according to Embodiment 1 of the present invention.

Icon: 100—Flow channel body; 110—Inlet component; 111—Inlet grille; 112—Outer tapered section; 113—First drip irrigation adhesive surface; 120—Energy dissipation body; 1211—First flow channel tooth set; 1212—Second flow channel tooth set; 1213—Flow channel teeth; 1221—The first support rib; 1222—The second support rib; 123—First insertion section; 124—First drainage channel; 125—Radial drainage channel; 126—Tube section; 130—Outlet component; 131—Outlet hole; 132—Second insertion section; 133—Second drip irrigation adhesive surface; 140—Annular projections; 200—Elastic body; 300—Outer sleeve; 400—Cavity; 500—Second drainage channel.

DETAILED DESCRIPTION

In order to make the purpose, technical solutions and advantages of the embodiments of the present invention more clearly, the technical solutions in the embodiments of the present invention will be described clearly and completely below in conjunction with the accompanying drawings in the embodiments of the present invention, and it is clear that the embodiments described are a part of the embodiments of the present invention, and not all of them. The components of the embodiments of the invention generally described and illustrated in the accompanying drawings herein can be arranged and designed in a variety of different configurations.

Accordingly, the following detailed description of embodiments of the invention provided in the accompanying drawings is not intended to limit the scope of the invention for which protection is claimed, but indicates only selected embodiments of the invention. Based on the embodiments in the present invention, all other embodiments obtained without creative labor by a person of ordinary skill in the art fall within the scope of protection of the present invention.

It should be noted that similar labels and letters indicate similar items in the accompanying drawings below, therefore, once an item is defined in one accompanying drawing, it does not need to be further defined and explained in the subsequent accompanying drawings.

In the description of the present invention, it should be noted that the terms "center", "top", "bottom", "left", "right", "vertical", "horizontal", "inner", "outer" and the other indicated orientations or positional relationships are based on the orientations or positional relationships shown in the accompanying drawings, or the orientations or positional relationships in which the product is customarily placed when in use, only to facilitate and simplify the description of the invention, and not to indicate or imply that the devices or components referred to must have a particular orientation, be constructed and operate in a particular orientation, and therefore are not to be construed as a limitation. In addition, the terms "first", "second", "third", etc. are used only to distinguish between descriptions and are not to be construed as indicating or implying relative importance.

The terms "Category I", "Category II" and "Category III", etc. are used only to distinguish and describe parts or features of the same kind in a uniform manner, implying that the number of parts or features can be multiple, but does not deny that the number of parts or features can be one.

In addition, the terms "horizontal", "vertical" and "overhang" do not mean that the part is required to be absolutely horizontal or overhanging, but can be slightly inclined. For example, "horizontal" only means that its direction is more horizontal compared to "vertical", it does not mean that the structure must be completely horizontal, but can be slightly inclined.

In the description of the present invention, it is also to be noted that, unless otherwise expressly specified and limited, the terms "set up", "install", "link", and "connect" should be understood in a broad sense. For example, it may be a fixed connection, a removable connection, or a one-piece connection; it may be a mechanical connection or an electrical connection; it may be a direct connection or an indirect connection through an intermediate medium, and it may be a connection within two components. To a person of ordinary skill in the art, the specific meaning of the above terms in the context of the present invention can be understood in specific cases.

Some embodiments of the present invention are described in detail below in conjunction with the accompanying drawings. The following embodiments and features in the embodiments can be combined with each other without conflict.

Embodiment 1

As shown in FIGS. 1 through 7, this embodiment provides a drip irrigation irrigator comprising a flow channel body 100 and an elastic body 200, the elastic body 200 being mounted on the outer periphery of the flow channel body 100 and fitting to the outer periphery of the flow channel body 100 in a spontaneous state, the flow channel body 100 comprising an energy dissipation body 120, the energy dissipation body 120 having a first drainage channel 124, the first drainage channel 124 being connected to two ends of the energy dissipation body 120, the energy dissipation body 120 being connected at two ends of the first drainage channel 124 with the inner wall of the elastic body 200 to form a radial drainage channel 125.

The energy dissipation body 120 is connected at two ends of the first drainage channel 124 with the inner wall of the elastic body 200 to form a radial drainage channel 125, which allows the water pressure $F_{water}$ exerted in the radial drainage channel 125 to the inner wall of the elastic body 200 to increase when the water pressure in the first drainage channel 124 increases, and the elastic body 200 begins to expand radially outward, so that the second drainage channel 500 can be formed between the inner wall of the elastic body 200 and the outer wall of the energy dissipation body 120. When the water pressure is low and $F_{water}$ is not sufficient to swell the elastic body 200, the elastic body (200) closes the circumference of the energy dissipation body 120, allowing water to flow only through the first drainage channel 124 of the energy dissipation body 120 to meet the needs of normal drip irrigation.

The formation of the second drainage channel 500 not only directly increases the total cross-sectional area of the drainage channel, but also the water flowing along the second drainage channel 500 is not impeded by the first flow channel tooth set 1211 and the second flow channel tooth set 1212 in the energy dissipation body 120, and its flow rate is higher, so the water flow rate of the drip irrigation irrigator can be significantly increased. When the sediment content in the water source is large, the first drainage channel 124 will be blocked, which will lead to increasing of water pressure $F_{water}$ in the radial drainage channel 125, and the second drainage channel 500 will automatically open, which can carry the sediment in the first drainage channel 124 out of the irrigator, to solve the problem of blockage of the irrigator.

The drip irrigation irrigator can be used in situations where the underground drip irrigation system requires a large flow rate, such as where the capillary action of the top soil is weak and crop emergence needs to be ensured, or where the soil salinity is drenched, or where the water source has a high sediment content and the irrigator is prone to clogging. The drip irrigation irrigator can meet the needs of ordinary small flow drip irrigation water supply scenarios; it can also be applied to occasions requiring larger flow rates, without the need to build a separate irrigation system, to save engineering investment.

In an optional embodiment, the energy dissipation body 120 has annular projections 140 at the two ends, the annular projections 140 extending along a circumference of the energy dissipation body 120, the elastic body 200 having two ends set on the annular projections 140.

The elastic body 200 having two ends set on the annular projections 140 at the two ends of the energy dissipation body 120, can use the annular projections 140 to expand and tighten the elastic body 200, and the two not only have a radial force between them, but also can use the elastic force as a radial force to generate friction, thus achieving the axial fixation of the elastic body 200 relative to the energy dissipation body 120.

In addition, the elastic body 200 of this embodiment is cylindrical, and the annular projections 140 extends along the full circumference of 360°, when the annular projections 140 expanding the ends of the elastic body 200, it also achieving a seal between the energy dissipation body 120 and the elastic body 200, so that the water can only flow through the first drainage channel 124 between the two ends of the elastic body 200 or the first drainage channel 124 and the second drainage channel 500 and will not flow out of the two ends of the elastic body 200.

In this embodiment, in the spontaneous state, the inner diameter of the cross-section of the elastic body 200 is D3, the diameter of the edge section of the annular projections 140 is D2, and D3<D2. Specifically, the material of the elastic body 200 may be silicone, rubber, etc.

In an optional embodiment, the annular projections 140, from the root of the annular projections 140 toward the edge of the slopes toward, tilt toward the inlet side of the axial direction of the flow channel body 100.

By setting the annular projections 140 to be tilted toward the inlet side of the flow channel body 100, it can make the elastic force directly applied to the elastic body 200 by the annular projections 140 when the two ends of the elastic body are expanded by the annular projections 140 to have a component toward the inlet direction of the flow channel body 100, thus improving the ability of the elastic body 200 to resist the pressure of the water flow along the axial direction and making the elastic body 200 more firmly fixed on the energy dissipation body 120.

In an optional embodiment, it further comprises an outer sleeve 300, the outer sleeve 300 being set outside of the elastic body 200.

By setting the outer sleeve 300, a certain elastic expansion space for the elastic body 200 can be set, forming a second drainage channel 500 with a set overflow cross-sectional area, the size of the elastic expansion space being determined by the maximum design water flow from the irrigator. In addition, the outer sleeve 300 can prevent damage or detachment of the elastic body 200 in the event of excessive pressure. Most importantly, because the outer sleeve 300 is sealed to the elastic body 200, pressurized water in the irrigation system cannot enter the cavity 400 between the outer sleeve 300 and the elastic body 200, the elastic body 200 can expand outward when the internal water pressure $F_{water}$ increases to a preset value. Without the sealing cavity 400 formed by the outer sleeve 300 and the elastic body 200, the pressure on the outside of the elastic body 200 is always greater than the pressure on the inside of the elastic body 200, and the elastic body 200 cannot expand and deform. Moreover, the water flow in the first drainage channel 124 on the inside of the elastic body 200 is dissipated by the flow channel teeth 1213, and the pressure will continue to decrease.

In particular, in this embodiment, the wall thickness of the elastic body 200 is d when undeformed, and the inner diameter of the outer sleeve 300 is D4, and D2<D4<D2+d. When the two ends of the elastic body 200 is expanded by the annular projections 140, the outer sleeve 300 can also clamp the two ends of the elastic body 200 from the inside and outside with the annular projections 140 to prevent axial movement of the elastic body 200.

In an optional embodiment, the energy dissipation body 120 comprises a first flow channel tooth set 1211, a second flow channel tooth set 1212 and support ribs, the first flow channel tooth set 1211 comprising a plurality of flow channel teeth 1213, the second flow channel tooth set 1212 comprising a plurality of flow channel teeth 1213, support ribs comprising the first support ribs 1221 and the second support ribs 1222, respective flow channel teeth 1213 of the first flow channel tooth set 1211 and the second flow channel tooth set 1212 being staggered and spaced apart, the first flow channel tooth set 1211 and the second flow channel tooth set 1212 forming a first drainage channel 124 between the first flow channel tooth set 1211 and the second flow channel tooth set 1212, respective flow channel teeth 1213 of the first flow channel tooth set 1211 being connected by the first support ribs 1221, respective flow channel teeth 1213 of the second flow channel tooth set 1212 being connected by the second support ribs 1222.

By staggering and spacing the respective flow channel teeth 1213 of the first flow channel tooth set 1211 and the second flow channel tooth set 1212 to form a folded first drainage channel 124, it can effectively increase the resistance of water flow through and reduce the pressure and flow rate when water reaching the outlet, thus realizing the smooth drip irrigation work with low flow rate when the elastic body 200 is not swollen open.

Specifically, in this embodiment, in a cross-section perpendicular to the axial direction in the area where the flow channel teeth 1213 are set in the energy dissipation body 120, the flow channel teeth 1213 and the support ribs form an outer envelope circle with a diameter of D1, D3<D1, D2>D1. i.e., when not expanded by the water pressure of the first drainage channel 124, the inner wall of the elastic body 200 will fit on the peripheral surface of the energy dissipation body 120, so that the water can only flow through the first drainage channel 124.

In an optional embodiment, the first drainage channel 124 extends from the circumference of the energy dissipation body 120 on one side of the two support ribs to the circumference of the energy dissipation body 120 on the other side of the two support ribs.

Figure 5:
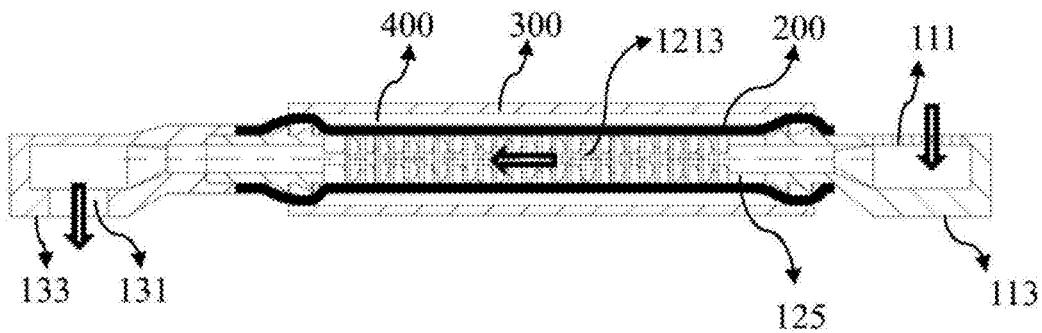
FIG. 5 shows a section view of the irrigation irrigator of Embodiment 1 of the present invention in the direction A-A of FIG. 1 when the irrigation system pressures≤rated operating pressure.
Figure 7:
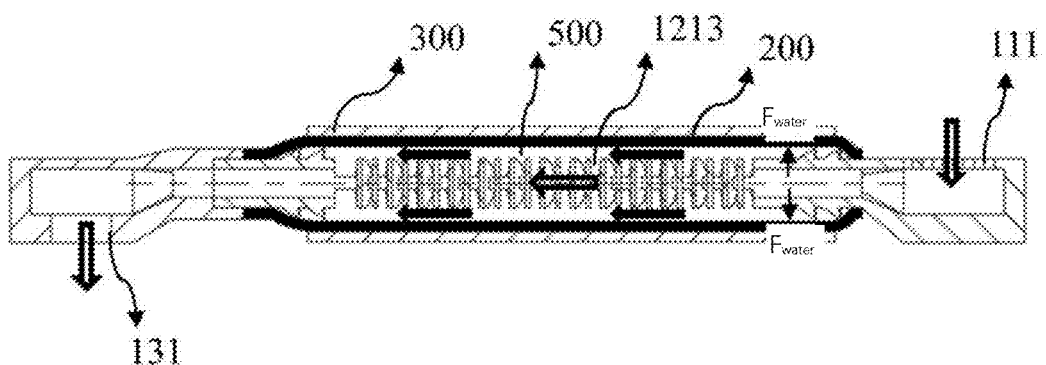
FIG. 7 shows a section view of the irrigation irrigator of Embodiment 1 of the present invention in the direction A-A of FIG. 1 when the irrigation system pressures>rated operating pressure.

Because the first drainage channel 124 can extend from the circumference of the energy dissipation body 120 on one side of the two support ribs to the circumference of the energy dissipation body 120 on the other side, i.e., from the upper circumference of the energy dissipation body 120 to the lower circumference in FIGS. 5 and 7. When the elastic body 200 is swollen open, it allows the water flow in the first drainage channel 124 to flow radially into the second drainage channel 500 in a timely manner, i.e., if radial flow occurs in the first drainage channel 124, the first drainage channel 124 actually acts as a partial equivalent of the radial diversion channel 125, avoiding the smaller gaps in the flow channel teeth 1213 and reciprocally folded paths to obstruct the flow of water, thus achieving a larger outflow. In particular, when the drainage channel 124 is blocked by sediment, after the first drainage channel 124 and the second drainage channel 500 are connected, the water flow in the second drainage channel 500 can be used to flush the first drainage channel 124 and carry the sediment away, thus achieving the cleaning of the first drainage channel 124.

Moreover, when the first drainage channel 124 is passed up and down, it can further realize the use of the area between the flow channel teeth 1213 to apply water pressure to the inner circumference of the elastic body 200 to swell the elastic body 200 so that the elastic body 200 remains swollen open all along the corresponding axial length to facilitate the smooth flow of water in the second drainage channel 500.

In an optional embodiment, the energy dissipation body 120 comprises a tube section 126, the tube section 126 being located at the two ends of the first drainage channel 124 and having a radial opening, the radial opening being located between the annular projections 140 at one end of the energy dissipation body 120 and the annular projections 140 at the other end of the energy dissipation body 120, forming a radial diversion channel 125.

By forming a radial opening in the tube section 126, it allows the water to flow directly to the second drainage channel 500 without flowing through the space between the flow channel teeth 1213, thus avoiding obstruction by the flow channel teeth 1213 and enhancing the response of the irrigator discharge flow to a sudden increase in pressure with the irrigation system.

Specifically, in this embodiment, the radial opening is located in the area between the part of the energy dissipation body 120 where having the annular projections 140 and the flow channel teeth 1213, so that the water entering the flow channel body 100 can flow through the second drainage channel 500 after it flows out of the radial opening in the tube section 126.

In an optional embodiment, one end of the energy dissipation body 120 has an outer tapered section 112, the diameter of the end of the outer tapered section 112 near the middle of the energy dissipation body 120 is smaller than the other end.

By setting the outer tapered section 112, the elastic body 200 can be set in from one end of the energy dissipation body 120, and the other end against the outer tapered surface of the outer tapered section 112, which also has the effect of expanding the elastic body 200, and also can strengthen the sealing effect.

In an optional embodiment, the energy dissipation body 120 comprises a first insertion section 123 at one end in a water discharge direction, and the flow channel body 100 further comprising an outlet component 130, an end of the outlet component (130) facing the energy dissipation body (120) having a second insertion section (132), the first insertion section (123) being inserted into the second insertion section (132), and an end face of the second insertion section (132) resting against the elastic body (200).

By setting the first insertion section 123 and the second insertion section 132, it is not only possible to first set the elastic body 200 on the dissipation body 120 and then connect the dissipation body 120 to the outlet component 130, which reduces the assembly difficulty and improves the assembly efficiency. But also, the sealing between the elastic body 200 and the flow channel body 100 can be further enhanced by using the end face of the second insertion section 132 against the cross section of the elastic body 200, creating a squeezing effect on the elastic body 200.

In an optional embodiment, the flow channel body 100 further comprises an inlet component 110, the inlet component 110 comprising an inlet grille 111 and a first drip irrigation adhesive surface 113, the inlet grille 111 facing radially toward the flow channel body 100, and the first drip irrigation adhesive surface 113 and the inlet grille 111 being located on the opposite sides of the inlet component 110.

Although the elastic body 200 has the ability to carry away the sediment wrapped in the first drainage channel 124 and can adapt to water sources with high sediment content, the inlet grille 111 is needed to filter large particles of sediment in order to prevent large particles from entering between the elastic body 200 and the dissipation body 120 and topping off the elastic body 200 persistently, causing the elastic body 200 to fail. In addition, setting the first drip irrigation adhesive surface 113 also facilitates the connection of the drip irrigation belt to the inlet component 110 for mass production in the production line.

In an optional embodiment, the flow channel body 100 further comprises an outlet component 130, the outlet component 130 having an outlet hole 131, the outlet hole 131 being in the opposite direction to the opening of the inlet grille 111.

By setting the direction of the outlet hole 131 to be opposite to the inlet grille 111, the flow direction of the pipes upstream and downstream of the drip irrigation is adapted to facilitate the popular application of this drip irrigation irrigator.

In an optional embodiment, the flow channel body 100 further comprises an outlet component 130, the outlet component 130 having a second drip irrigation adhesive surface 113, the second drip irrigation adhesive surface 133 being oriented in opposite direction to the first drip irrigation adhesive surface 113.

The first drip irrigation adhesive surface 113 and the second drip irrigation adhesive surface 133 are oriented in opposite directions to facilitate the bonding of one side of the inlet component 110 and the other side of the outlet component 130 to the inner surface of the drip irrigation tape respectively, thus facilitating their mass production in the production line.

The assembly principle of this embodiment is as follows:

The elastic body 200 can be inserted by the first insertion section 123 of the energy dissipation body 120 until it contacts the outer tapered section 112, tightly wrapping the outer circumference of the energy dissipation body 120. The outer sleeve 300 can be inserted by the first insertion section 123 of the energy dissipation body 120 until the outer tapered section 112 forming a cavity 400 between it and the elastic body 200 which is dense and impermeable to water. The elastic body 200 cannot move axially under the clamping action of the outer sleeve 300 with a number of annular projections 140. The first flow channel tooth set 1211 of the energy dissipation body 120 and the flow channel teeth 1213 of the second flow channel tooth set 1212 form a first drainage channel 124 under the wrapping of the elastic body 200. The energy dissipation body 120 is sealed and connected to the outlet component 130 by means of a first insertion section 123 and a second insertion section 132.

The plane in which the inlet grille 111 of the inlet component 110 is located is parallel to the plane in which the outlet hole 131 of the outlet component 130 is located, i.e., the second drip irrigation adhesive surface 133, but the inlet grille 111 is oriented in the opposite to the outlet hole 131. After the irrigator is assembled, the first drip irrigation adhesive surface 113 and the second drip irrigation adhesive surface 133 can be bonded to the inner wall of the drip irrigation belt through the drip irrigation belt production line, and the drip irrigation belt is provided with through holes at the location of the outlet holes 131 of the outlet component 130.

Figure 2:
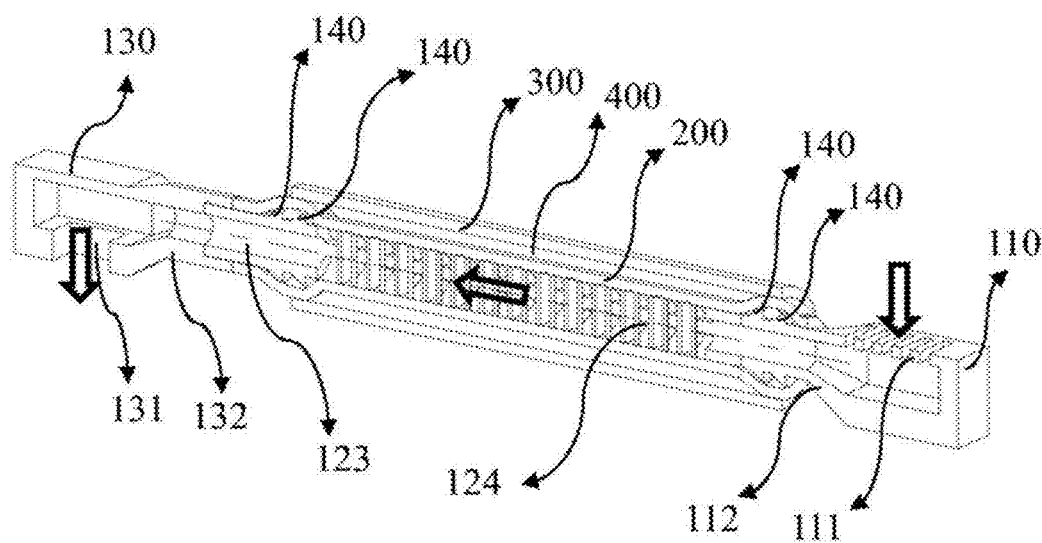
FIG. 2 is a sectional axonometric drawing of the drip irrigation irrigator in FIG. 1 along the A-A direction of FIG. 1.
Figure 3:
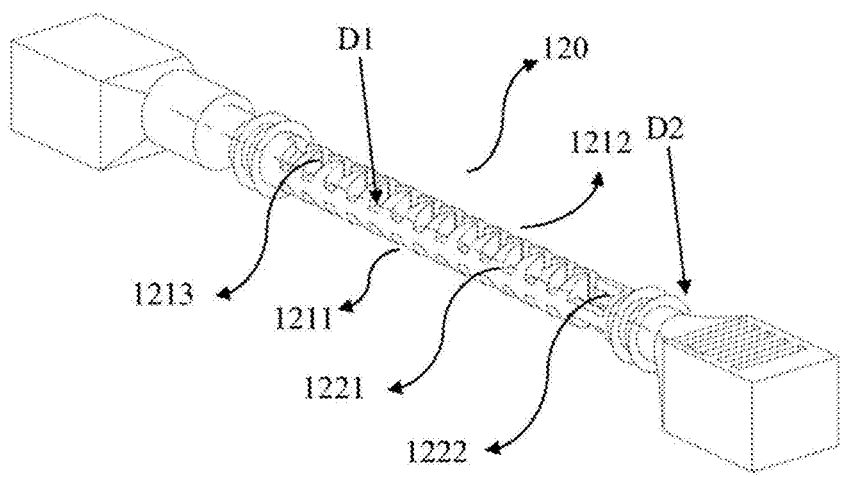
FIG. 3 shows an axonometric drawing of the flow channel body in Example 1 of the present invention.
Figure 4:
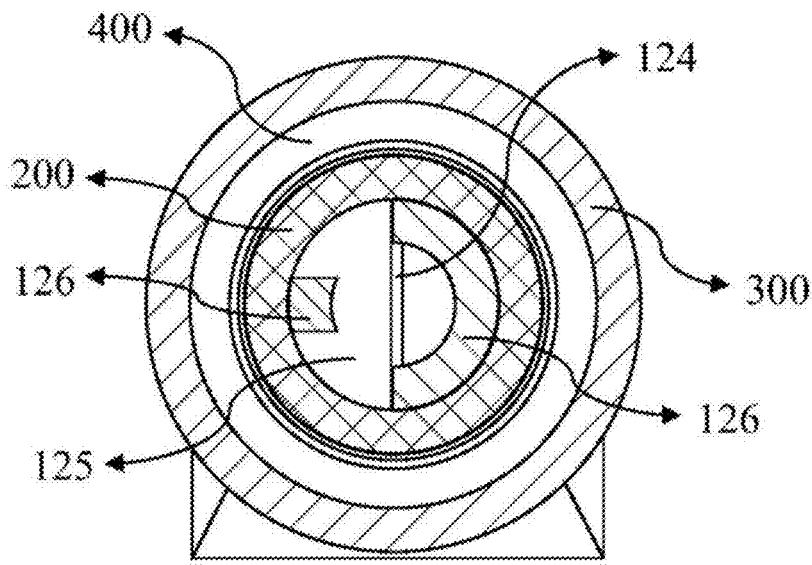
FIG. 4 shows a section view of the drip irrigation irrigator of Embodiment 1 of the present invention along the axial direction perpendicular to the drip irrigator at the radial drainage channel.
Figure 6:
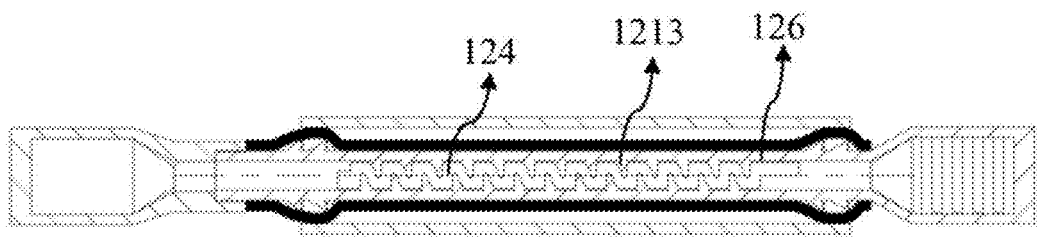
FIG. 6 shows a section view of the irrigation irrigator of Embodiment 1 of the present invention in the direction B-B of FIG. 1 when the irrigation system pressures≤rated operating pressure.

The principle of action of this embodiment is as follows:

As shown in FIGS. 5 and 6, initially, the irrigation system pressure is ≤rated operating pressure (e.g., 0.1 MPa), the elastic body 200 is tightly wrapped around the cylindrical energy dissipation body 120 under its own elasticity, and the water in the drip irrigation belt enters the drip irrigation irrigator from the inlet grille 111 of the inlet component 110 and moves along the first drainage channel 124 to the outlet hole 131 of the outlet component 130, with the direction of water movement as shown by the black hollow arrows in FIGS. 2 and 5. Under the energy dissipative effect of several flow channel teeth 1213 in the cylindrical energy dissipation body 120, the water pressure and flow velocity are reduced and the water flows out of the outlet hole 131 in the form of drops of water.

As shown in FIG. 7, when it needs to increase the water flow rate of the irrigator at the crop emergence period or autumn watering desalination period, the water supply pressure of the irrigation system can be increased, to increase the internal water pressure $F_{water}$ of the first drainage channel 124, or when the first drainage channel 124 of the irrigator is blocked by sediment, the internal water pressure $F_{water}$ of the first drainage channel 124 increases spontaneously, and the elastic body 200 between a number of annular projections 140 in the water pressure $F_{water}$ under the action of water pressure $F_{water}$, can be in the space of the cavity 400 in all directions deformation, until reaching the top to the inner wall of the outer sleeve 300. At this point, after the elastic body 200 is disengaged from the outer side of the cylindrical energy dissipation body 120, the water flow can move in the first drainage channel 124 and the second drainage channel 500, i.e., in the direction shown by the black solid arrow and the black hollow arrow in FIG. 6. At this point, the drainage channel becomes larger, the flow of water out of the water outlet hole 131 significantly increased, can also carry the sediment in the irrigator out of it.

Embodiment 2

This embodiment provides a drip irrigation system comprising the drip irrigation irrigators of any of the preceding embodiments.

Since the drip irrigation system provided by this embodiment includes the drip irrigation irrigators of any of the above, it has the technical effect of the drip irrigation irrigators of any of the above, which will not be repeated here.

Finally, it should be noted that the above embodiments are intended only to illustrate the technical solution of the invention and not to limit it; although the invention is described in detail with reference to the preceding embodiments, it should be understood by those of ordinary skill in the art that it is still possible to modify the technical solution described in the preceding embodiments or to make equivalent substitutions for some or all of the technical features thereof. For example:

In Embodiment 1, the elastic body 200 is set on the outside of the energy dissipation body 120 within the whole circumference of 360°. In fact, the elastic body 200 can be set outside the energy dissipation body 120 without the whole circumference. For example, it can be set on half of the circumference angle, or ⅓ of the angle, and the rest is non-deformable material, which can also serve to expand the elastic body 200 under pressure and form the second drainage channel 500, to increase the area of the water crossing section.

In Embodiment 1, the respective flow channel teeth 1213 of the first flow channel tooth set 1211 and the second flow channel tooth set 1212 are equally spaced. In fact, the size of the spacing and whether or not the spacing is equally spaced can be chosen based on the actual flow demand situation.

And these modifications or replacements do not make the essence of the corresponding technical solutions out of the scope of the technical solutions of the various embodiments of the invention.

The invention claimed is:

1. A drip irrigation irrigator, comprising:
a flow channel body;
an elastic body, the elastic body being mounted on an outer periphery of the flow channel body and fitting to the outer periphery of the flow channel body the flow channel body comprising an energy dissipation body, the energy dissipation body having a first drainage channel, the first drainage channel being connected to a first end and a second end of the energy dissipation body, the energy dissipation body being connected at a first end and a second end of the first drainage channel with an inner wall of the elastic body to form a radial drainage channel;
the energy dissipation body having annular projections at the first and second ends, the annular projections extending along a circumference of the energy dissipation body, the elastic body having two ends set on the annular projections;
an outer sleeve, the outer sleeve being set outside the elastic body;
the energy dissipation body also having a first flow channel tooth set, a second flow channel tooth set and a set of support ribs, the first flow channel tooth set comprising a plurality of flow channel teeth, the second flow channel tooth set comprising a plurality of flow channel teeth, respective flow channel teeth of the first flow channel tooth set and the second flow channel tooth set being staggered and spaced apart;
the first flow channel tooth set and the second flow channel tooth set forming a first drainage channel between the first flow channel tooth set and the second flow channel tooth set, respective flow channel teeth of the first flow channel tooth set being connected by the support ribs, respective flow channel teeth of the second flow channel tooth set being connected by the support ribs;
the first drainage channel extending from the circumference of the energy dissipation body on a first side of the two support ribs to the circumference of the energy dissipation body on an opposite side of the two support ribs;
the energy dissipation body comprising a tube section, the tube section being located at the two ends of the first drainage channel and having a radial opening, the radial opening being located between the annular projections at the first end of the energy dissipation body and the annular projections at the second end of the energy dissipation body, forming a radial drainage channel;
the energy dissipation body comprising a first insertion section at one end in a water discharge direction, and the flow channel body further comprising an outlet component, an end of the outlet component facing the energy dissipation body having a second insertion section, the first insertion section being inserted into the second insertion section, and an end face of the second insertion section resting against the elastic body;
the flow channel body further comprising an inlet component, the inlet component comprising an inlet grille and a first drip irrigation adhesive surface, the inlet grille facing radially towards the flow channel body, and the first drip irrigation adhesive surface and the inlet grille being located on opposite sides of the inlet component; and
the flow channel body further comprising an outlet component, the outlet component having a second drip irrigation adhesive surface, the second drip irrigation adhesive surface being oriented opposite the first drip irrigation adhesive surface.

2. A drip irrigation system comprising the drip irrigation irrigator according to claim 1.

* * * * *